United States Patent [19]

Iwao et al.

[11] 4,187,385

[45] Feb. 5, 1980

[54] PROCESS FOR THE POLYMERIZATION OF ETHYLENE OR ALPHA-OLEFINS AND CATALYST THEREFOR

[75] Inventors: Tetsuya Iwao, Zushi; Heizo Sasaki, Tokyo; Akira Ito, Yokohama; Masahiro Kono, Manazuru, all of Japan

[73] Assignee: Mitsui Toatsu Chemical, Inc., Tokyo, Japan

[21] Appl. No.: 797,227

[22] Filed: May 16, 1977

[30] Foreign Application Priority Data

| | | | |
|---|---|---|---|
| May 17, 1976 | [JP] | Japan | 51-55422 |
| May 17, 1976 | [JP] | Japan | 51-55423 |
| Jun. 10, 1976 | [JP] | Japan | 51-67092 |
| Jun. 10, 1976 | [JP] | Japan | 51-67093 |

[51] Int. Cl.$^2$ .......................... C08F 4/66; C08F 10/06
[52] U.S. Cl. ................... 526/128; 252/429 B; 252/429 C; 526/116; 526/119; 526/125; 526/127; 526/129; 526/132; 526/133; 526/139; 526/140; 526/141; 526/142; 526/143; 526/156; 526/159; 526/904
[58] Field of Search ........... 252/429 A, 429 B, 429 C; 526/63, 128, 139–143, 119, 122, 159, 903, 904, 906

[56] References Cited

U.S. PATENT DOCUMENTS

| | | | |
|---|---|---|---|
| 3,004,962 | 10/1961 | Matlack | 526/63 |
| 3,014,016 | 12/1961 | Natta et al. | 526/125 |
| 3,984,350 | 10/1976 | Karayannis et al. | 526/142 |
| 4,028,481 | 6/1977 | Shiomura et al. | 526/906 |

FOREIGN PATENT DOCUMENTS

| | | | |
|---|---|---|---|
| 1300734 | 12/1972 | United Kingdom | 526/903 |
| 1384603 | 2/1975 | United Kingdom | 526/903 |

*Primary Examiner*—Edward J. Smith
*Attorney, Agent, or Firm*—Sughrue, Rothwell, Mion, Zinn and Macpeak

[57] ABSTRACT

Polymerization of ethylene or α-olefins using a catalyst comprising a titanium component obtained by copulverizing the starting titanium component of Ziegler catalysts and organoaluminum compound with a small amount of ethylene or α-olefins, and an organoaluminum component. The titanium catalyst component can be modified by subjecting the copulverized titanium component to a contact with an inert organic solvent or its mixture with a modifier (1) an oxygen-, sulphur-, phosphor-, nitrogen- or silicon- containing organic compound, (2) a combination of such an organic compound and an aluminum halide, (3) an organoaluminum compound or (4) a Lewis acid.

11 Claims, No Drawings

PROCESS FOR THE POLYMERIZATION OF ETHYLENE OR ALPHA-OLEFINS AND CATALYST THEREFOR

BACKGROUND OF THE INVENTION

This invention relates to a process for the polymerization of ethylene or α-olefins for providing polymers with an improved particle size distribution and a high stereoregularity, and a catalyst therefor.

The most typical Ziegler catalysts which are used for the polymerization of ethylene or α-olefins comprises a titanium compound-containing catalyst component and an organoaluminum compound.

It is well-known that a catalyst activity is improved by pulverizing a titanium catalyst component such as titanium trichloride and its compositions (for example, Japanese Patent Publications No. 14125/60 and No. 24271/64), by copulverizing the titanium component with various compounds (for example, Japanese Patent Publications No. 24270/64, No. 24272/64, No. 10065/68, British Pat. No. 1087314, U.S. Pat. No. 3,764,591, Japanese Application Kokai Nos. 48-68497, 48-29694, 48-38295 and 49-53196), or by subjecting these pulverized products to a modification treatment with an organic solvent or its mixtures with a modifier agent (for example, U.S. Pat. No. 3,850,899, Japanese Patent Publication Nos. 48638/74, 17319/75, 48637/74 and British Pat. No. 1370559).

However, when such pulverization and modification treatments are conducted, the resulting titanium catalyst component is, in general, remarkably broadened in the particle size distribution and thus, more than 10% by weight of the particles has a size smaller than 5 microns.

When homopolymerization or copolymerization of ethylene or α-olefins is carried out using a catalyst comprising a titanium catalyst component and an organoaluminum compound, the particle size of the resulting polymer or copolymer is markedly influenced by the particle size of the titanium component used. Thus, using the titanium component having a wide particle size distribution, in which fine particles are included in large quantities, the resulting homopolymers or copolymers have a wide particle size distribution, in which fine powders of less than 50 microns are usually included in an amount of 10 to 30% by weight.

When the polymers obtained have a wide particle size distribution and particularly, contain a large amount of fine powders, separating of the polymers from a solvent by filtrating or centrifuging encounters a difficulty and further, owing to scattering of the polymer fine powders in the drying and pelletizing steps, the loss of polymers increases. Thus, superfluous equipments must be provided for overcoming such disadvantages so that the production of polymer must be conducted by the complicated process. Therefore the improvement has been required.

Various methods for improving a catalyst activity have been proposed as mentioned above. Among them a modification treatment of the starting titanium trichloride by various modifiers is disclosed, for example, in U.S. Pat. No. 3,850,899, Japanese Patent Publication No. 48638/74 and British Pat. No. 1370559. As set forth in Comparative Examples given hereinafter, these methods are effective to some degree with respect of improvements in the catalyst activity, however, during the modification treatment the titanium trichloride component is divided to fine particles so that the preparation of polymer in a commercial scale encounters difficulties as mentioned above.

SUMMARY OF THE INVENTION

An object of this invention is to provide a process for the polymerization of ethylene or α-olefins for forming polymers with a narrow particle size distribution, in which the content of fine powders is extremely reduced.

Another object of this invention is to provide ethylene or α-olefin polymers having a high stereoregularity.

A further object of this invention is to provide an improved titanium catalyst component of the Ziegler type, having a narrow particle size distribution, in which the content of fine particles is extremely reduced, and having a high catalyst activity.

A still further object of this invention is to provide a modified titanium catalyst component of a high activity subjected to a modification treatment without bringing about an increase in content of fine particles.

The foregoing and other objects can be attained by polymerizing ethylene or α-olefins with use of a catalyst comprising (A) a titanium component obtained by copulverizing the starting titanium component of Ziegler solid catalysts and an organoaluminum compound of the formula, $$Al\, R_m X_{3-m}$$

wherein R is alkyl or aryl, X is hydrogen or halogen and m is 1 to 3, together with ethylene or α-olefins in a small amount of not more than about 10% by weight of said starting titanium component, and (B) an organoaluminum component.

According to this invention, further, the polymerization may be conducted using a modified titanium catalyst component obtained by subjecting the above copulverized titanium component to a modification treatment through contact with an inert organic solvent or its mixtures with modifiers selected from the group consisting of (1) an oxygen-, sulphur-, phosphor-, nitrogen- or silicon-containing organic compound, (2) a combination of said organic compound of the item (1) with aluminum halides, (3) an organoaluminum compound and (4) Lewis acid.

DETAILED DESCRIPTION OF THE INVENTION

The starting titanium component which may be used includes titanium trichloride or its compositions, or titanium tetrachloride, titanium trichloride or its compositions, supported with a solid carrier. The titanium trichloride and its compositions used herein include titanium trichloride obtained, for example, by reduction of titanium tetrachloride with hydrogen, an eutectic material of titanium trichloride with a metal chloride obtained by reduction of titanium tetrachloride with a metal, a titanium trichloride composition obtained by reduction of titanium tetrachloride with a Si-H bond containing compound or an organoaluminum compound, and other titanium trichloride compositions.

Examples of the solid carrier which may be used are silica, alumina, silica-alumina, boron oxide, magnesium compounds and others. Preferably, magnesium compounds, particularly magnesium halides are used. Supporting of the titanium compound with the solid carrier may be conducted in the conventional methods, for example, by mixing and pulverizing these two components or by reacting them while heating in the presence of or in the absence of a solvent.

Further, a titanium trichloride-containing material which is obtained by adding to titanium trichloride or its compositions materials selected from the group of the above-mentioned modifiers as an additive and pulverizing them together may be used as the starting titanium component. Amounts of the additive used are comprised between 0.5 and 100 moles %, preferably 2 and 70 moles % on the basis of titanium trichloride. The additive is usually added prior to the pulverizing treatment, through the addition may be effected in the course of pulverization or divided in two or more times. The starting titanium component may be subject to pre-pulverization so that the next copulverization treatment can be conducted conveniently.

The starting titanium component is copulverized together with a small amount of ethylene or α-olefins and an organoaluminum compound of the formula, Al $R_m X_{3-m}$ wherein R, X and m are as defined above. With this copulverization particle sizes of the titanium component are controlled. Examples of the organoaluminum compound are triethylaluminum, triisobutylaluminum, diethylaluminum monochloride, diisobutylaluminum monochloride, diethylaluminum monobromide, ethylaluminum sesquichloride and others. The organoaluminum compound is used in an amount of preferably 0.01 to 100 moles based on 1.0 gram atom of titanium of the starting material and may be added prior to the pre-pulverization of the starting material.

Amounts of ethylene or α-olefins to be added in the copulverization treatment are below about 10% by weight of the starting titanium component, and the lower limit is usually about 0.01% by weight. The range of 0.1 to 10 weight % is preferred. If an amount of the olefin is less than about 0.01 weight %, for example, with 0.005 weight %, the effect of controlling particle sizes can not be obtained. On the other hand, when the amount exceeds about 10 weight %, for example, with 15 weight %, the particle size controlling effect is attained, but the resulting titanium catalyst results in formation of polymers having ununiform particle shapes as well s ununiform particle sizes and therefore, bulk density of the polymer is lowered. Further, with the amount of 20 weight %, the copulverized products are solidified on the wall of a pulverizer so that a powdery catalyst can not be obtained. Lower α-olefins such as propylene and butene-1 may be used as the above-mentioned α-olefin, but they are not necessarily the same as monomers used in polymerization by a catalyst.

The copulverization treatment may be conducted in substantially the absence of oxygen and water by means of the conventional pulverizers such as a ball mill, vibration mill, column mill and jet mill. The copulverization may be also effected in the presence of a small amount of hydrogen. The copulverization temperature is not particularly defined, but it is generally in the range of −30° to 150° C. The copulverization time is in general in the range of 1 to 100 hours. In the pulverization the olefin may be charged in the form of vapour or liquid.

The following is considered to be the reason why the copulverized products of titanium catalyst component prepared according to this invention are controlled in particle sizes, but is should be noted that this invention is not bound by this theoretical explanation. When the starting titanium component and the organoaluminum compound are subject to the copulverization, agglomeration of particles takes place simultaneously with dividing to fine particles. At this time a small amount of polyethylene or poly-α-olefin is formed by polymerization of ethylene or α-olefins added in the copulverization step and then, they act as a binding agent among the resulting particles and accordingly, prevent the agglomerated particles of titanium component from the redispersing and dividing to fine particles.

Thus, according to this invention, the copulverized products of the titanium catalyst component have a narrow particle size distribution, in which the content of fine particles of less than 5μ in diameter is below several percent of weight. Further, by polymerizing or copolymerizing olefins with use of the titanium component thus obtained, there are provided polymers or copolymers with a narrow particle size distribution, in which the content of fine powders is extremely reduced.

According to this invetion, it has been, further, found that when the above-mentioned, copulverized titanium component is subject to a modification treatment, a high modification effect can be attained without bringing about an increase of content of fine particles and an enlargement of a particle size distribution. The term of "modification treatment" used herein means the procedure of bringing a titanium component into contact with an inert organic solvent or its mixtures with a modifier and separating the titanium component from the solvent. The term of "washing treatment" used herein means the modification procedure through contact with an inert organic solvent.

The modification treatment may be effected in various modes of embodiment depending upon types of the starting material and purposes, for example, by washing the copulverized product with the organic solvent, followed by separating; by washing with the organic solvent and thereafter contacting with a mixture of the organic solvent and the modifier, followed by separating, by contacting with a mixture of the organic solvent and the modifier, followed by separating, by repeatedly contacting with different types of the organic solvent or its mixture with the modifier, followed by separating.

A further preferred embodiment comprises subjecting the starting titanium component to the modification treatment prior to the above copulverization step and subjecting the titanium component after the copulverization to a further modification treatment. In this way the modification effect can be further elevated.

Examples of the inert organic solvent which may be used for the modification include aliphatic, alicyclic or aromatic hydrocarbons, halogen derivatives thereof or mixtures thereof. Preferred examples are hexane, heptane, cyclohexane, benzene, toluene, xylene, monochlorobenzene and the like.

The organic solvent is used in the range of 1 to 500 parts by weight of the copulverized product and the washing treatment is carried out at temperatures of 0° to 200° C. After the treatment, the copulverized products are separated from the solvent by decantation or filtration. If desired, the solvent may be removed while heating under normal pressure or reduced pressure to dry the copulverized product. Further, these washing and separating procedures may be repeatedly effected several times, if desired.

The modifier which may be used in mixture with the organic solvent is selected from the group consisting of (1) to (4) as indicated hereunder. The additives which are added to the starting titanium and pulverized together are selected from the under-mentioned groups like the modifier.

(1) Oxygen-, sulphur-, phosphor-, nitrogen- or silicon-containing organic compounds:

(1-1) Oxygen-containing organic compounds: Ethers, ketones and esters may be used.

Ethers which may be used are saturated or unsaturated ethers having the formula, $R^1$—O—$R^2$ wherein $R^1$ and $R^2$ each is alkyl, aralkyl, cycloalkyl or aryl or those substituted with halogen, and cyclic ethers and polyethers. Examples of these ethers are diethyl ether, di-n-propyl ether, di-n-butyl ether, di-iso-amyl ether, dibenzyl ether, dicyclohexyl ether, diphenyl ether, di-tolyl ether, methylphenyl ether, diallyl ether, di-butenyl ether, di(4-chlorophenyl)ether, 2-chlorophenyl ether, tetrahydrofuran, propylene exide, diethyleneglycol dimethyl ether, diethyleneglycol dipropyl ether, ethyleneglycol dimethyl ether, ethyleneglycol diphenyl ether and ethyleneglycol ditolyl ether.

Ketones which may be used are saturated or unsaturated ketones represented by the formula,

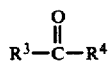

wherein $R^3$ and $R^4$ each is alkyl, aralkyl, cycloalkyl or aryl, or those substituted with halogen, or cyclic ketones or ester ketones.

Examples of these ketones are acetone, diethyl ketone, methylisobutyl ketone, methylbenzyl ketone, acetophenone, diphenyl ketone, cyclohexanone, acethylacetone, allylphenyl ketone, p-chlorophenyl methyl ketone and methyltollyl ketone.

Esters which may be used are saturated or unsaturated esters represented by the formula,

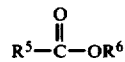

wherein $R^5$ and $R^6$ each is alkyl, alkenyl, aralkyl, cycloalkyl or aryl, or those substituted with halogen, or cyclic esters; for example, methyl acetate, ethyl acetate, methyl acetoacetate, methyl methacrylate, cyclohexyl acetate, benzyl acetate, methyl benzoate, ethyl benzoate, ε-caprolactone and ethyl chloroacetate.

Among them, diethyl ether, di-n-butyl ether, di-iso-amyl ether, diphenyl ether, ditolyl ether, 2-chlorophenyl ether, diethyl ketone, diphenyl ketone, methyl acetate and ethyl bonzoate are preferred.

(1-2) Sulphur-containing organic compounds:

Thioethers, thiophenols and thioalcohols may be used.

Thioethers which may be used are saturated or unsaturated thioethers represented by the formula,

wherein $R^7$ and $R^8$ each are alkyl, aralkyl, cycloalkyl or aryl, or those substituted with halogen, or cyclic thioethers; for example, diethyl thioether, di-n-propyl thioether, dicyclohexyl thioether, diphenyl thioether, ditolyl thioether, methylphenyl thioether, ethylphenyl thioether, propylphenyl thioether, dibenzyl thioether, diallyl thioether, allylphenyl thioether, 2-chlorophenyl thioether, ethylene sulfide, propylene sulfide and tetramethylene sulfide.

Thiophenols and thioalcohols which may be used are saturated or unsaturated thiophenols and thioalcohols represented by the formula,

wherein $R^9$ is alkyl, aralkyl, cycloalkyl or aryl, or those substituted with halogen; for example, ethyl thioalcohol, n-propyl thioalcohol, n-butyl thioalcohol, n-hexyl thioalcohol, n-dodecyl thioalcohol, cyclohexyl thioalcohol, benzyl thioalcohol, allyl thioalcohol, thiophenol, o-methyl thiophenol, p-methyl thiophenol, 2-chloroethyl thioalcohol and p-chlorothiophenol.

Among them, diethyl thioether, di-n-propyl thioether, dibenzylthioether, diphenyl thioether, methylphenyl thioether, ethylphenyl thioether, tetramethylene sulfide, n-dodecyl thioalcohol and thiophenol are preferred.

(1-3) Phosphor-containing organic compounds:

Compounds represented by the following formulae (I)–(XVII) may be used.

(a) Phosphines represented by formula (I), $$PR_3^{10} \tag{I}$$

wherein $R^{10}$ is hydrogen, alkyl, aralkyl, cycloalkyl or aryl; for example, ethylphosphine, diethylphosphine, phenylphosphine, diphenylphosphine, triethylphosphine, tri-n-butylphosphine, tri-n-decylphosphine, tribenzylphosphine, tricyclohexylphosphine, triphenylphosphine, tritolylphosphine, diethyl-n-butylphosphine, ethyldiphenylphosphine, n-propyl-n-butylphenylphosphine, ethylbenzylphenylphosphine and the like.

(b) Phosphinoushalides represented by formula (II)

$$PR_2^{11}X \tag{II}$$

wherein $R^{11}$ is alkyl, cycloalkyl or aryl and X is halogen atom; for example, dimethylphosphinous bromide, diethylphosphinous chloride, diisopropylphosphinous chloride, methylethylphosphinous chloride, diphenylphosphinous chloride, ethylphenylphosphinous chloride and the like.

(c) Phosphonousdihalides represented by formula (III), $$PR^{12}X_2 \tag{III}$$

wherein $R^{12}$ is alkyl, aralkyl, cycloalkyl or aryl and X is halogen atom; for example, methylphosphonous dichloride, methylphosphonous dibromide, ethylphosphonous dibromide, butylphosphonous dichloride, benzylphosphonous dichloride, cyclohexylphosphonous dichloride, phenylphosphonous dichloride, and phenylphosphonous dibromide.

(d) Phosphinites represented by formula (IV), $$PR_2^{13}(OR^{14}) \tag{IV}$$

wherein $R^{13}$ and $R^{14}$ each is alkyl, aralkyl or aryl; for example, ethyldiethylphosphinite, ethyldipropylphosphinite, ethyldibutylphosphinite, phenyldiphenylphosphinite, ethyldiphenylphosphinite, phenyldibenzylphosphinite and ethylmethylphenylphosphinite.

(e) Phosphonites represented by formula (V), $$PR^{15}(OR^{16})_2 \tag{V}$$

wherein $R^{15}$ and $R^{16}$ each is alkyl, aralkyl or aryl; for example, dimethylethylphosphonite, diethylethylphosphonite, diethylbutylphosphonite, diethylbenzylphosphonite, diethylphenylphosphonite, diphenylmethylphosphonite and diphenylethylphosphonite.

(f) Phosphites represented by formula (VI), $$P(OR^{17})_3 \tag{VI}$$

wherein $R^{17}$ is hydrogen, alkyl, aralkyl, cycloalkyl or aryl, or those substituted with halogen; for example, dimethyl phosphite, diphenyl phosphite, dioctyl phosphite, trimethyl phosphite, tri(2-chloroethyl) phosphite, tri(n-butyl) phosphite, tribenzyl phosphite, tricyclohexyl phosphite, triphenyl phosphite, tri(p-tolyl) phosphite, tri-β-naphthyl phosphite, diphenylcyclohexyl phosphite, and diphenylpropyl phosphite.

(g) Halogenophosphites represented by formula (VII), $$P(OR^{18})_2X \tag{VII}$$

wherein $R^{18}$ is alkyl, cycloalkyl or aryl and X is halogen atom; for example, dimethylchlorophosphite, diethylchlorophosphite, di-n-butylchlorophosphite, dicyclohexylchlorophosphite, diphenylchlorophosphite and di-p-tolylchlorophosphite.

(h) Dihalogenophosphites represented by formula (VIII), $$P(OR^{19})X_2 \tag{VIII}$$

wherein $R^{19}$ is alkyl or aryl, of those substituted with halogen atom and X is halogen atom; for example, methyldichlorophosphite, methylchlorofluorophosphite, ethyldichlorophosphite, n-butyldichlorophosphite, phenyldichlorophosphite, p-chlorophenyldichlorophosphite and 2-chloroethyldichlorophosphite.

(i) Aminophosphines represented by formulae (IX), (X) and (XI), $$P(NR_2^{20})_3 \tag{IX}$$

$$P(NR_2^{21})_2X \tag{X}$$

$$P(NR_2^{22})X_2 \tag{XI}$$

wherein $R^{20}$, $R^{21}$ and $R^{22}$ each is alkyl or aryl and X is halogen atom; for example, tris(dimethylamino) phosphine, tris(diethylamino) phosphine, tris(di-n-butylamino) phosphine, phosphorous tri(N-methylanilide), bis(dimethylamino) chlorophosphine, dimethylaminodifluorophosphine, diethylaminodichlorophosphine, diethylaminodichlorophosphine and (di-n-butylamino) dichlorophosphine.

(j) Phosphates represented by formula (XII), $$P(O)(OR^{23})_3 \tag{XII}$$

wherein $R^{23}$ is hydrogen, alkyl, aralkyl, cycloalkyl or aryl, or those substituted with halogen; for example, methyl dihydrogenphosphate, ethyl dihydrogenphosphate, n-butyl dihydrogenphosphate, cyclohexyl dihydrogenphosphate, phenyl dihydrogenphosphate, p-chlorophenyl dihydrogenphosphate, diethyl phosphate, di-n-propyl phosphate, dibenzyl phosphate, diphenyl phosphate, di-α-naphthyl phosphate, dibiphenyl phosphate, triethyl phosphate, tri(n-butyl) phosphate, tri(n-amyl) phosphate, tricyclohexyl phosphate, tri(o-chlorophenyl) phosphate, triphenyl phosphate, tri-p-tolyl phosphate, tri-m-tolyl phosphate, tri-4-biphenylyl phosphate, and tri(α-naphthyl) phosphate.

(k) Phosphorohalogedates represented by formula (XIII), $$P(O)(OR^{24})_2X \tag{XIII}$$

wherein $R^{24}$ is alkyl, cycloalkyl or aryl and X is halogen atom; for example, dimethylphosphorochloridate, diethylphosphorochloridate, diisopropylphosphorochloridate, dicyclohexylphosphorochloridate and diphenylphosphorochloridate.

(l) Phosphorodihalogedates represented by formula (XIV), $$P(O)(OR^{25})X_2 \tag{XIV}$$

wherein $R^{25}$ is alkyl or aryl and X is halogen atom; for example, methylphosphorodichloridate, ethylphosphorodichloridate, ethylphosphorochloridofluoridate, n-butylphosphorodichloridate, p-tolylphosphorodichloridate and phenylphosphorodichloridate.

(m) Phosphine oxides represented by formulae (XV) and (XVI) and derivatives thereof, $$R_3^{26}P=O \tag{XV}$$

$$(R_2^{27}N)_3P=O \tag{XVI}$$

wherein $R^{26}$ and $R^{27}$ each is alkyl, aralkyl, cycloalkyl or aryl; for example, trimethylphosphine oxide, tri-n-butylphosphine oxide, tribenzylphosphine oxide, tricyclohexylphosphine oxide, triphenylphosphine oxide, diallylphenylphosphine oxide, diphenylbenzylphosphine, diphenyl-p-tolylphosphine oxide, tris-N,N-dimethylphosphoramide and tris-N,N-diethylphosphoramide.

(n) Phosphine sulfides represented by formula (XVII), $$R_3^{28}P=S \tag{XVII}$$

wherein $R^{28}$ is alkyl, aralkyl or aryl; for example, trimethylphosphine sulfide, triethylphosphine sulfide, tri-n-propylphosphine sulfide, tri-n-butylphosphine sulfide, triphenylphosphine sulfide, diethylphenylphosphine sulfide and diphenylbenzylphosphine sulfide.

Among these phosphor-containing organic compounds, triphenylphosphine, triphenylphosphite, triphenylphosphine oxide, triphenylphosphate, tri-p-tolylphosphate and the like are particularly preferred.

(1-4) Nitrogen-containing organic compounds:

Amines, isocyanates, azo compounds and nitrile compounds are used.

Amines which may be used are compounds represented by the formula, $$R_n^{29}NH_{3-n}$$

wherein $R^{29}$ is hydrocarbon radical and n is 1 to 3, and heterocyclic compounds containing nitrogen; for example, triethylamine, tributylamine, trihexylamine, triphenylamine, N,N'-dimethylaniline, aniline, N-methylaniline, butylamine, dibutylamine, pyridine, quinoline and 2-chloropyridine.

Isocyanates which may be used are compounds represented by the formula, $$R^{30}NCO$$

wherein $R^{30}$ is hydrocarbon radical; for example, phenylisocyanate, toluylisocyanate and the like.

Azo compounds which may be used are compounds represented by the formula, $$R^{31}-N=N-R^{32}$$

wherein $R^{31}$ and $R^{32}$ each is hydrocarbon radical; for example, azobenzene.

Nitriles which may be used are compounds represented by the formula, $$R^{33}-CN$$

wherein $R^{33}$ is hydrocarbon radical; for example, acetonitrile and benzonitrile.

(1-5) Silicon-containing organic compounds:

Compounds which may be used are tetrahydrocarbylsilanes and their halogen or alkoxy derivatives, linear or cyclic organopolysilanes, siloxane polymers, and other silicon-containing organic compounds.

Tetrahydrocarbylsilanes and their halogen derivatives are compounds represented by the formula, $$R_n^{34}SiX_{4-n}$$

wherein $R^{34}$ is hydrocarbon radical, X is halogen atom and n is 1 to 4; for example, tetramethylsilane, trimethylphenylsilane, tetraphenylsilane, trimethylvinylsilane, ethyltrichlorosilane, diethyldichlorosilane, triethylchlorosilane, phenyltrichlorosilane, diphenyldichlorosilane, vinyltrichlorosilane, diethyldifluorosilane and others.

Alkoxy derivatives of tetrahydrocarbylsilanes are compounds represented by the formula, $$R_n^{35}Si(OR^{36})_{4-n}$$

wherein $R^{35}$ and $R^{36}$ each is hydrocarbon radical and n is 1 to 3; for example, trimethoxymethylsilane, diethyldiethoxysilane, triphenylethoxysilane and the like.

Examples of linear or cyclic organopolysilanes are hexamethyldisilane, hexaphenyldisilane, dodecamethylcyclohexasilane and the like.

Siloxane polymers which may be used are polymers having a recurring unit of the formula, $$\begin{array}{c} R^{37} \quad R^{37} \\ | \quad\quad | \\ -O-Si-O-Si- \\ | \quad\quad | \\ R^{37} \quad R^{37} \end{array}$$

wherein $R^{37}$ is hydrogen, alkyl or aryl, such as alkylsiloxane polymers, arylsiloxane polymers and alkylarylsiloxane polymers; for example, octamethyltrisiloxane, octaethyltrisiloxane, dimethylpolysiloxane, ethylpolysiloxane, methylethylpolysiloxane, hexaphenylcyclosiloxane, diphenylpolysiloxane, diphenyloctamethylpolysiloxane, methylphenylpolysiloxane and the like.

Examples of other silicon-containing organic compounds include hexamethylsilazane, triethylisocyanesilazane, triphenylisocyanatosilane, cyanomethyltrimethylsilane, trimethylsilylacetone and others.

(2) Combination of aluminum halides with the oxygen-, sulphur-, phosphor-, nitrogen- or silicon-containing organic compounds as set forth in items (1-1)-(1-5):

Examples of aluminum halides include aluminum trichloride, aluminum tribromide, aluminum trifluoride and aluminum triiodide, and particularly, aluminum trichloride is preferred.

These organic compounds and aluminum halides may be added separately or used in the form of a mixture thereof. The molar ratio of the organic compound to the aluminum halide is in general 1:1, though any one of the two components may be used in excess.

Further, a complex or reaction product of the organic compound with the aluminum halide may be used. Preferred examples include diphenylether-aluminum trichloride complex, diphenylether-aluminum tribromide complex, diethylether-aluminum trichloride complex, diethylketone-aluminum trichloride complex, diphenylthioether-aluminum trichloride complex, phenylmethylthioether-aluminum trichloride complex, thiophenol-aluminum trichloride reaction products, diethylthioether-aluminum trichloride reaction products, triphenylphosphine-aluminum trichloride complex, triphenylphosphite-aluminum trichloride complex, triphenylphosphate-aluminum trichloride complex, tritolylphosphate-aluminum trichloride complex, tris-N,N-dimethylphosphoramide-aluminum trichloride and others.

The above-mentioned complex or reaction products can be prepared in the conventional methods, for example, by mixing the aluminum trihalide with the above organic compound at room temperature or by heating mixtures of the two components.

In the synthesis of the above complex or reaction products the molar ratio of the two components is preferably about 1:1, though any one may be used in excess.

(3) Organoaluminum compounds:

Compounds which may be used are represented by the formula, $$AlR_n'X_{3-n}'$$

wherein $R'$ is hydrocarbon radical, $X'$ is hydrogen, halogen or alkoxyl and n is 1 to 2.

Examples of the compound are diethylaluminum monochloride, diisopropylaluminum monochloride, diisobutylaluminum monochloride, dihexylaluminum monochloride, ethylaluminum sesquichloride, isopropylaluminum sesquichloride, isobutylaluminum sesquichloride, ethylaluminum dichloride, isobutylaluminum dichloride, diethylaluminum monobromide, diethylaluminum monofluoride, diethylaluminum monoiodide and the like.

(4) Lewis acids:

Examples of Lewis acids which may be used include titanium tetrachloride, boron fluoride, boron chloride, silicon tetrachloride, vanadium tetrachloride, vanadium oxychloride, phosphorus trichloride and the like.

The modifier is used within the range of 0.001 to 100 parts by weight, preferably 0.01 to 50 parts by weight based on 1 part by weight of the copulverized product.

The mixing ratio of the organic solvent to the modifier is not particularly limited and determined depending upon types of the organic solvent and the modifier.

The mixture of the organic solvent and the modifier is in general brought into contact with the copulverized product while allowing to stand or stirring at temperatures of 0° to 200° C., though the contact conditions are not particularly defined. The contact treatment is carried out effectively using Soxhlet's extractor, a counter current contact column and the like.

After the contact treatment, the copulverized product is separated from the solvent by decantation or filtration. If desired, the solvent may be removed while heating under normal pressure or reduced pressure to dry the copulverized product. Further, these procedures may be repeatedly effected several times, if desired.

The titanium trichloride or its compositions subjected to the modification treatment according to this invention have a narrow particle size distribution, in which the content of fine particles of less than 5µ in diameter is below several percent by weight. Further, by polymerizing or copolymerizing olefins with use of the modified titanium trichloride or its compositions, there are provided polymers or copolymers with a narrow particle size distribution, in which the content of fine powders is extremely reduced.

Further surprisingly, it has been found that the use of the modified titanium catalysts of this invention gives unexpected effects that polymerization or copolymerization of olefins is advanced with a rapid polymerization velocity and polymers are obtained with a high stereoregularity, as compared with use of titanium catalysts modified by the conventional methods.

The organoaluminum compound which may be used as another catalyst component in this invention is represented by the formula, $$AlR_mX_{3-m}$$

wherein R, X and m are as defined above, which is the same as that used in the copulverization step of the titanium catalyst component.

Examples of the organoaluminum compound include the same compounds as exemplified hereinbefore.

The ratio of the titanium catalyst component (A) and the organoaluminum compound (B) used in this invention may be varied within a wide range. In general, the molar ratio of component (B) to component (A) is preferred to be in the range of 1-500.

The catalyst of this invention is useful not only for homopolymerization of ethylene or α-olefins, but also for copolymerization of these monomers, for example, for copolymerization of ethylene with propylene, butene-1, pentene-1, hexene-1 or 4-methyl-pentene-1 or of propylene with butene-1 or hexene-1.

The polymerization reaction is carried out in the conventional method using the usual reaction conditions. The polymerization temperature is generally in the range of 20°-300° C., preferably 50°-200° C., and the pressure is in the range of from normal pressure to 200 atm., preferably from normal pressure to 150 atm.

In the polymerization reaction, a solvent such as an aliphatic, alicyclic or aromatic hydrocarbon or mixture thereof may be used and may be, for example, propane, butane, pentane, hexane, heptane, cyclohexane, benzene, toluene or mixtures thereof.

Also, a bulk polymerization may be employed using liquid monomers themselves as the solvent.

Alternatively, the polymerization reaction may be conducted in the vapour phase wherein gaseous monomers are directly contacted with the catalyst without use of a solvent.

The molecular weight of polymers produced by the method of this invention varies depending on the manner of reaction, kind of catalyst and polymerization conditions. However, the molecular weight may be controlled by adding to the reaction system, for example, hydrogen, an alkyl halide and a dialkyl zinc, if necessary.

This invention will be illustrated by way of the following examples. Also, for the purpose of comparison there are set forth Comparative Examples which are beyond the scope of this invention.

EXAMPLE 1

30 g of titanium trichloride obtained by reduction of TiCl₄ with hydrogen at a high temperature were charged under nitrogen atmosphere into a pot of about 1 l in inner volume, in which 100 steel balls with a diameter of 12 mm were placed, and subject to a vibration mill pulverization for 30 hours.

Next, 0.3 ml of diethylaluminum monochloride were added and copulverized for 5 minutes and then, 200 ml of gaseous propylene were charged over 4 hours while continuing the copulverization.

Titanium trichloride thus obtained contains fine particles (below about 5µ) of 3.4 weight %. The content of fine particles was measured by the following method:

Pulverized products of titanium trichloride were charged into an upright pipe purged by nitrogen, in which gaseous nitrogen was fed in a rate of 0.7 cm/sec from the lower part to the upper part for 15 hours. Fine particles overflowed from the pipe were collected into a dust chamber which had been connected to the pipe. The content of fine particles in the pulverized products is indicated by a ratio of the collection amount to the charge amount.

Polymerization of propylene was conducted with use of the above titanium trichloride having particle sizes controlled.

1000 ml of heptane, 1.2 g of the above titanium trichloride and 2.0 ml of diethylaluminum monochloride were fed into a stainless steel autoclave with an inner volume of 2 l under nitrogen atmosphere.

The autoclave was purged with propylene and then hydrogen was fed till the partial pressure of 0.5 kg/cm². The autoclave was heated while stirring the contents and after 5 minutes the inner temperature was elevated to 70° C., at the temperature of which polymerization was continued. During the polymerization, propylene was continuously forced into the autoclave to maintain the inner pressure at 5 kg/cm²G. After polymerization of 4 hours the feeding of propylene was discontinued, 300 ml of methanol were added to decompose the catalyst and then, 483 g of polymers were obtained.

Extraction residue with boiling n-heptane (hereinafter referred to as II): 82.3%

Limiting viscosity number (measured in tetralin at 135° C.): 1.83 dl/g

Bulk density: 0.42 g/ml

Polymerization activity (rate of polymer formation per gram of activated Ti (cat.) per hour): 101 g/g.cat/hr The powdery polymer obtained was screened and fine powders having a size smaller than 200 mesh (hereinafter referred to as a mere "fine powders") were measured. The fine powder content was 9.3 weight %.

COMPARATIVE EXAMPLE 1

The starting titanium trichloride as used in Example 1 was pulverized alone for 34 hours and fine particles were measured in the same manner as in Example 1. The content of fine particles was 18.3 weight %.

Using the pulverized titanium trichloride, polymerization was conducted in the same manner as in Example 1.

II: 80.3%
Limiting viscosity number: 1.73 dl/g
Bulk density: 0.38 g/ml
Content of fine powders: 28.7%
Polymerization activity: 83 g/g.cat/hr

EXAMPLE 2

An eutectic material having the composition of approx. TiCl$_3$.⅓ AlCl$_3$ was prepared by reducing TiCl$_4$ with aluminum powders in the presence of AlCl$_3$. This is hereinafter referred to as "Type A TiCl$_3$." In the same manner as in Example 1, 30 g of Type A TiCl$_3$ were pulverized for 30 hours and then, copulverized together with 0.3 ml of diethylaluminum monochloride and 100 ml of gaseous ethylene.

Fine particles of the copulverized product were measured in the same manner as in Example 1 and as a result, the content was 3.7%.

Using 0.6 g of the titanium trichloride having particle sizes controlled and 1.2 ml of Al(C$_2$H$_5$)$_2$Cl, polymerization was conducted in the same manner as in Example 1.

II: 91.1%
Limiting viscosity number: 1.68 dl/g
Bulk density: 0.43 g/ml
Content of fine powders: 7.8%
Polymerization activity: 265 g/g.cat/hr

COMPARATIVE EXAMPLE 2

Type A TiCl$_3$ as used in Example 2 was pulverized alone for 34 hours and fine particles were measured in the same manner as in Example 1 and as a result, the content was 21.3%.

Using the pulverized Ti catalyst, polymerization was conducted in the same manner as in Example 1.

II: 88.9%
Limiting viscosity number: 1.68 dl/g
Bulk density: 0.41 g/ml
Content of fine powders: 23.4%
Polymerization activity: 232 g/g.cat/hr

EXAMPLE 3

Example 2 was repeated except that 200 ml of gaseous butene-1 were used instead of ethylene in the controlling of particle sizes. The content of fine particles was 4.3%.

The polypropylene obtained by polymerization gave II of 90.8%, limiting viscosity number of 1.77 dl/g, bulk density of 0.42 g/ml and a fine powder content of 8.3%. The polymerization activity was 235 g/g.cat/hr.

EXAMPLE 4

29.4 g of anhydrous magnesium chloride and 0.6 g of TiCl$_4$ were pulverized for 20 hours in the same vibration mill as in Example 1, then 0.3 ml of triisobutylaluminum were added and further, gaseous ethylene was fed in the rate of 50 ml/hr over 4 hours while continuing the copulverization. Thus the titanium composition with controlled particle sizes was obtained. The content of fine particles was 5.0 weight %.

Using a catalyst consisting of the above titanium composition and triisobutylaluminum, polymerization of ethylene was conducted in accordance with the manner of Example 1.

The polymer obtained gave a fine powder content of 3.8%.

COMPARATIVE EXAMPLE 3

For the purpose of comparison, Example 4 was repeated except that the particle size controlling by ethylene was not conducted. The pulverized titanium composition gave a fine particle content of 18.7%. The resulting polyethylene gave a fine powder content of 15.3%.

COMPARATIVE EXAMPLES 4 TO 6

Example 2 was repeated varying an amount of ethylene added in the copulverizing step. Titanium catalyst components (copulverized products) thus obtained are set forth in Table 1.

Table 1

| Run No. | Amount of Ethylene, ml *1 | Copulverized Products | | Remarks |
|---|---|---|---|---|
| | | Fine Particles % | Bulk Density g/ml | |
| Comparative Example 4A | 1.25 (0.005) | 19.8 | 1.0 | |
| Example 5A | 3750 (15) | 5.8 | 0.6 | Block-like aggregates formed; ununiform particle sizes and shapes. |
| Example 6A | 7500 (30) | — | — | Copulverized products solidified; no powdery catalyst formed. |
| Example 2 | 100 (0.4) | 3.7 | 1.1 | |

*1 : Parentheses mean a weight % based on the starting material.

In Comparative Example 6A, the copulverized products were solidified on the wall of the pulverizer so that a powdery catalyst could not be obtained.

Polymerization was conducted with use of titanium catalysts prepared in Comparative Examples 4A and 5A. The results are indicated in Table 2.

Table 2

| Run No. | Polymerization Activity, g/g.cat/hr | II % | Fine Powders % | Bulk Density g/ml | Remark |
|---|---|---|---|---|---|
| Comparative Example 4B | 255 | 88.9 | 22.3 | 0.41 | |
| Example 5B | 175 | 90.5 | 7.3 | 0.28 | Block-like polymers formed. |

In Comparative Example 5A, fine particles of the copulverized product were reduced, but block-like aggregates were formed and the particle sizes and shapes were ununiform so that the bulk density was lowered. Accordingly, in the polymerization with use of this catalyst, block-like polymers were obtained as shown in Comparative Example 5B.

On the other hand, when an amount of ethylene added is too small as set forth in Comparative Example 4A, fine particles of the copulverized product increase so that the particle size controlling effect cannot be attained. Accordingly, fine powders of the resulting polymer increase as shown in Comparative Example 4B.

EXAMPLE 5

(1) Preparation of Ti Component

There was prepared a vibration mill provided with a pulverization pot of about 600 ml in capacity, in which about 80 steel balls of 12 mm in diameter were placed.

30 g of Type A $TiCl_3$ were charged under nitrogen atmosphere into the above pot and pulverized for 40 hours. The pulverized products obtained are hereinafter referred to as "Type AA $TiCl_3$."

Next, 1.0 ml of $Al(C_2H_5)_2Cl$ was added and pulverized for 15 minutes and thereafter, copulverization was effected for 3 hours while feeding 200 ml of a gaseous propylene.

After separating the copulverized products from the steel balls under nitrogen atmosphere, 30 g of the Ti component obtained were added with 150 ml of n-heptane and stirred at the boiling point of heptane for 20 minutes. Next, the n-heptane was removed by decantation. After conducting this procedure five times, 150 ml of heptane were added to obtain an activated Ti component in the form of suspension.

(2) Polymerization 1.0 l of n-heptane, 0.45 g of the above activated Ti component and 1.0 ml of $Al(C_2H_5)_2Cl$ were charged under nitrogen atmosphere into a stainless steel autoclave of 2.0 l in capacity.

After exhausting the nitrogen from the autoclave by means of a vacuum pump, hydrogen was fed till a partial pressure of 1.0 kg/cm$^2$ and then, propylene was fed till a vapour pressure of 2 kg/cm$^2$ Gauge. The autoclave was heated and after 5 minutes, the inner temperature was elevated to 70° C., at the temperature of which polymerization was continued. During the polymerization, propylene was continuously forced into the autoclave to maintain the inner pressure at 5 kg/cm$^2$ Gauge.

After 3.5 hours, the amount of propylene polymerized reached about 500 g, then the feeding of propylene was discontinued, and 300 ml of methanol were added and stirred for 30 minutes to decompose the catalyst.

After cooling the autoclave, the contents were removed, washed three times with 200 ml of water at 60° C., filtered and dried under reduced pressure. Thus 498 g of a white polypropylene were obtained.
Limiting viscosity number: 1.63 dl/g
Bulk density: 0.42 g/ml
Extraction residue with boiling n-heptane (hereinafter referred to as "Powder-II"): 96.0%

On the other hand, 22 g of amorphous polypropylene were obtained by vapourizing the filtrate.
Polymerization activity: 330 g/g.cat/hr
Ratio of extraction residue polymer with boiling n-heptane to the whole polymer (hereinafter referred to as a mere "Total II"): 91.9%
Content of fine powders: 8.3 weight %
Content of coarse powders having a size smaller than 20 mesh and larger than 100 mesh: 71.0 wt.%

COMPARATIVE EXAMPLES 7-9

Using Type AA $TiCl_3$ as prepared in Example 5(1) (Comparative Ex. 7), a Ti catalyst component prepared by conducting the copulverization of Example 5(1) without the feeding of propylene (Comparative Ex. 8) and a Ti catalyst component prepared by the method of Example 5(1) except that the washing treatment with heptane was not conducted, respectively, polymerization was conducted in the same manner as in Example 5(2).

The results are set forth in Table 3 together with Example 5 for the purpose of comparison.

Table 3

|  | Polymerization Time (hr) | Yield of Polypropylene Powders (g) | Yield of Amorphous Polypropylene (g) | Powder II (%) | Total II (%) | Polymerization Activity g/g.cat/hr |
|---|---|---|---|---|---|---|
| Example 5 | 3.50 | 498 | 22 | 96.0 | 91.9 | 330 |
| Comparative Example 7 | 5.20 | 476 | 39 | 95.2 | 88.0 | 218 |
| Example 8 | 4.05 | 482 | 28 | 96.0 | 90.7 | 280 |
| Example 9 | 4.35 | 476 | 34 | 95.8 | 89.5 | 260 |

Analysis of Polymers

|  | Limiting Viscosity Number (dl/g) | Bulk Density (g/ml) | Content of Fine Powders (wt. %) | Content of Coarse Powders *2 (wt. %) |
|---|---|---|---|---|
| Example 5 | 1.63 | 0.43 | 8.0 | 71.0 |
| Comparative Example 7 | 1.68 | 0.40 | 23.4 | 53.6 |
| Example 8 | 1.59 | 0.40 | 27.3 | 51.8 |
| Example 9 | 1.59 | 0.42 | 7.8 | 70.3 |

*2 : Powders having a size smaller than 20 mesh and larger than 100 mesh.

EXAMPLE 6

A mixture of 30 g of Type-A $TiCl_3$ and 6.9 g of aluminum chloride-diphenyl ether complex was pulverized for 40 hours in the same manner as in Example 5(1), then 300 ml of gaseous propylene and 1.0 ml of $Al(C_2H_5)_2Cl$ were added, and copulverization was conducted for 2 hours.

The copulverized products were subject to the washing treatment with heptane according to Example 5(1).

With use of the activated Ti component thus obtained, polymerization was conducted in the same manner as in Example 5(2). After polymerization of 2.10 hours, 505 g of a powdery polypropylene (PP) and 15 g of an amorphous polypropylene (PP) were obtained.

Polymerization activity: 550 g/g.cat/hr
Limiting Viscosity number: 1.67 dl/g
Bulk Density: 0.43 g/ml
Powder II: 97.0%
Total II: 94.3%
Content of fine powders: 7.3%

COMPARATIVE EXAMPLE 10

The catalyst preparation and polymerization were conducted in the same manner as in Example 6 except that the copulverization step in the presence of propylene and Al(C$_2$H$_5$)$_2$Cl was omitted.

After polymerization of 2.32 hours, 484 g of PP having a limiting viscosity number of 1.58 dl/g, a Powder II of 96.3% and a bulk density of 0.40 g/ml and 16 g of an amorphous PP were obtained.
Polymerization activity: 478 g/g.cat/hr
Total II: 93.2%

Content of fine powders: 28.7%

It is apparent from a comparison between this Comparative Example and Example 6 that according to this invention the fine powder content of polymer is extremely reduced and the polymerization activity and Total II are improved.

EXAMPLES 7 TO 78

The catalyst preparation and polymerization were conducted in the same manner as in Example 6 except that various materials as set forth in Table 4 were used instead of the diphenyl ether-aluminum chloride complex as the additive in the first pulverization step.

Further, Example 6 was repeated except that various α-olefins were used instead of propylene in the second pulverization step and that various organic solvents were used instead of n-heptane in the washing treatment. The results are set forth in Table 4.

In case of using n-hexane, n-heptane, cyclohexane, benzene and toluene as the solvent, the washing was conducted at their respective boiling temperature, and in case of monochlorobenzene and xylene, at 100° C. (the same shall apply hereinafter).

Table 4, further, indicates the fine powder content of control polymers obtained by polymerization with use of Ti catalysts which were prepared omitting the above-mentioned, second pulverization step.

Table 4

| Ex. No. | Catalysts 1st Pulverization Component 1 | 1st Pulverization Component 2 | 2nd Pulverization Additives | 2nd Pulverization Amount ml | Washing Treatment Solvents | Polymerization Time hr | Activity g/g.cat/hr | Limiting Viscosity Number dl/g | Total II % | Content of Fine Powders, % | Control Polymers: Fine Powders % |
|---|---|---|---|---|---|---|---|---|---|---|---|
| 7 | Ethylether-AlCl$_3$ complex 1.6 g | Non | Ethylene | 300 | Toluene | 2.55 | 453 | 1.63 | 93.3 | 6.3 | 27.8 |
| 8 | Diethylketone-AlCl$_3$ complex 1.65 g | " | Butene-1 | " | " | 2.27 | 513 | 1.63 | 91.0 | 4.8 | 20.3 |
| 9 | Diphenylether-AlBr$_3$ complex 2.3 g | " | Propylene | " | Monochlorobenzene | 2.15 | 530 | 1.57 | 93.5 | 8.8 | 28.8 |
| 10 | Di-n-butyl-ether - AlCl$_3$ complex 2.4 g | " | " | " | Monochlorobenzene | 2.28 | 508 | 1.77 | 93.7 | 8.8 | 23.8 |
| 11 | Diphenylthioether - AlCl$_3$ complex 2.4 g | " | " | " | n-Hexane | 2.63 | 435 | 1.65 | 95.8 | 7.7 | 23.3 |
| 12 | Methylphenyl thioether - AlCl$_3$ complex 1.9 g | " | " | " | " | 2.60 | 438 | 1.66 | 96.0 | 7.0 | 24.5 |
| 13 | Triphenyl-phosphine - AlCl$_3$ complex 2.3 g | " | " | " | " | 2.40 | 481 | 1.60 | 94.7 | 7.3 | 27.3 |
| 14 | Triphenyl-phosphite - AlCl$_3$ complex 1.8 g | " | " | " | " | 2.45 | 470 | 1.65 | 94.6 | 5.7 | 22.4 |
| 15 | Triphenyl-phosphate - AlCl$_3$ complex 2.5 g | " | " | " | " | 2.50 | 447 | 1.63 | 94.5 | 5.6 | 22.4 |
| 16 | Tris-NN-di-methyl-phosphoramide - AlCl$_3$ complex 1.0 g | " | Ethylene | " | Benzene | 2.66 | 438 | 1.63 | 94.5 | 7.1 | 23.8 |

Table 4-continued

| | Catalysts | | | | | Polymerization | | | | Control Polymers: Fine Powders % |
|---|---|---|---|---|---|---|---|---|---|---|
| | 1st Pulverization | | 2nd Pulverization | | Washing Treatment Solvents | Time hr | Activity g/g.cat/hr | Limiting Viscosity Number dl/g | Total II % | Content of Fine Powders, % | |
| Ex. No. | Component 1 | Component 2 | Additives | Amount ml | | | | | | | |
| 17 | Di(4-methyl) phenylether - AlCl₃ complex 4.5 g | " | " | 100 | Xylene | 2.35 | 502 | 1.67 | 93.7 | 9.3 | 24.3 |
| 18 | Tetra-methylene-sulfide - AlCl₃ complex 1.0 g | " | Butene-1 | 300 | " | 2.70 | 432 | 1.67 | 95.6 | 8.7 | 22.0 |
| 19 | Thiophenol - AlCl₃ (1:1) react. product 1.0 g | " | " | " | Cyclo-hexane | 2.60 | 412 | 1.60 | 95.8 | 7.0 | 24.8 |
| 20 | p-Methyl-phenol - AlCl₃ (1:1) react. product 1.0 g | " | Ethylene | 100 | Toluene | 2.63 | 422 | 1.60 | 95.4 | 8.3 | 27.0 |
| 21 | Phenyldi-phenyl-phosphinite - AlCl₃ complex 1.0 g | " | " | " | " | 2.63 | 430 | 1.51 | 95.3 | 9.1 | 21.8 |
| 22 | Diphenyl-phenyl-phosphonite - AlCl₃ complex 1.0 g | " | " | " | " | 2.50 | 453 | 1.67 | 95.5 | 7.3 | 22.3 |
| 23 | Diphenylether 3.2 g | AlCl₃ 1.6 g | Propylene | 200 | " | 2.27 | 513 | 1.65 | 94.0 | 7.8 | 22.8 |
| 24 | Diphenylether 1.6 g | AlBr₃ 1.6 g | " | " | " | 2.23 | 488 | 1.60 | 93.9 | 8.0 | 27.3 |
| 25 | Diphenylether 1.34 g | AlI₃ 1.84 g | Ethylene | 300 | Heptane | 2.32 | 499 | 1.77 | 93.9 | 7.3 | 27.3 |
| 26 | Diphenyl-ketone 1.1 g | AlCl₃ 1.4 g | " | " | " | 2.30 | 485 | 1.62 | 91.9 | 3.8 | 26.6 |
| 27 | Acetylacetone 1.1 g | AlCl₃ 1.4 g | " | " | Toluene | 2.47 | 459 | 1.51 | 93.0 | 7.7 | 28.3 |
| 28 | Methylacetate 0.33 g | AlCl₃ 1.0 g | Propylene | " | " | 2.52 | 445 | 1.60 | 93.8 | 7.0 | 27.0 |
| 29 | Diethyl thioether 0.40 g | AlCl₃ 0.59 g | " | " | " | 2.50 | 448 | 1.53 | 95.4 | 8.0 | 23.9 |
| 30 | Ditolyl thioether 0.56 g | AlCl₃ 0.35 | " | " | " | 2.63 | 413 | 1.70 | 96.0 | 9.3 | 27.7 |
| 31 | Methylphenyl thioether 0.56 g | AlCl₃ 0.60 g | " | " | " | 2.68 | 439 | 1.65 | 96.0 | 9.0 | 23.8 |
| 32 | Triphenyl-phosphine 1.0 g | AlCl₃ 0.56 g | " | " | " | 2.37 | 468 | 1.60 | 94.8 | 7.0 | 27.0 |
| 33 | Dimethyl-phosphinous bromide 0.7 g | AlBr₃ 1.33 g | " | " | " | 2.47 | 453 | 1.61 | 95.0 | 8.0 | 27.7 |
| 34 | Methyl-phosphonous dichloride 0.4 g | AlI₃ 1.39 g | " | " | " | 2.55 | 446 | 1.77 | 94.6 | 9.1 | 23.8 |
| 35 | Ethyldi-phenyl-phosphonite 0.6 g | AlCl₃ 0.35 g | " | " | " | 2.75 | 425 | 1.65 | 94.7 | 8.8 | 28.3 |
| 36 | Triphenyl-phosphite 0.26 g | AlCl₃ | " | " | " | 2.50 | 453 | 1.60 | 94.9 | 7.7 | 27.0 |
| 37 | Diphenyl-chloro-phosphite 0.4 g | AlBr₃ 0.42 g | " | " | " | 2.65 | 435 | 1.53 | 94.5 | 7.3 | 27.0 |
| 38 | Phenyldi-chloro-phosphite 0.3 g | AlI₃ 0.63 g | " | " | " | 2.48 | 457 | 1.63 | 95.0 | 8.8 | 27.9 |
| | Trisdiethyl- | | | | | | | | | | |

Table 4-continued

| | Catalysts | | | | Polymerization | | | | | Control Polymers: Fine Powders % |
|---|---|---|---|---|---|---|---|---|---|---|
| | 1st Pulverization | | 2nd Pulverization | | Washing Treatment Solvents | Time hr | Activity g/g.cat/hr | Limiting Viscosity Number dl/g | Total II % | Content of Fine Powders, % | |
| Ex. No. | Component 1 | Component 2 | Additives | Amount ml | | | | | | | |
| 39 | amino-phosphine 0.4 g | AlCl₃ 0.33 g | ″ | ″ | ″ | 2.65 | 420 | 1.65 | 94.6 | 7.8 | 29.3 |
| 40 | Triphenyl-phosphate 1.0 g | AlCl₃ 0.41 g | ″ | ″ | ″ | 2.40 | 465 | 1.55 | 95.1 | 7.0 | 20.3 |
| 41 | Diphenyl-phosphoro-chloridate 0.4 g | AlCl₃ 0.2 g | ″ | ″ | ″ | 2.66 | 444 | 1.63 | 94.6 | 7.3 | 21.1 |
| 42 | Phenyl-phosphoro-dichloridate 0.4 g | AlCl₃ 0.25 g | ″ | ″ | ″ | 2.64 | 430 | 1.63 | 94.4 | 9.1 | 21.3 |
| 43 | Triphenyl-phosphine oxide 0.4 g | AlCl₃ 0.25 g | ″ | ″ | ″ | 2.57 | 450 | 1.65 | 94.1 | 8.0 | 27.7 |
| 44 | Triphenyl-phosphine sulfide 0.4 g | AlCl₃ 0.19 g | ″ | ″ | ″ | 2.63 | 423 | 1.57 | 95.7 | 8.0 | 23.0 |
| 45 | Di(2-chloro-phenyl)ether 1.43 g | AlCl₃ 0.10 g | ″ | ″ | ″ | 2.36 | 470 | 1.65 | 93.9 | 5.7 | 20.3 |
| 46 | Ethylene-glycol diphenyl ether 0.96 g | AlCl₃ 0.5 g | ″ | ″ | ″ | 2.50 | 450 | 1.57 | 93.9 | 7.7 | 22.0 |
| 47 | Methyl benzoate 0.61 g | AlCl₃ 1.0 g | ″ | ″ | ″ | 2.42 | 466 | 1.63 | 93.4 | 7.8 | 23.0 |
| 48 | Tetra-methylene sulfide 0.40 g | AlCl₃ 0.6 g | ″ | ″ | ″ | 2.66 | 435 | 1.71 | 95.9 | 7.4 | 24.0 |
| 49 | Thiophenol 0.49 g | AlCl₃ 0.6 g | Butene-1 | ″ | ″ | 2.57 | 433 | 1.68 | 95.9 | 8.0 | 27.1 |
| 50 | Triethyl amine 0.5 g | AlCl₃ 0.25 g | ″ | ″ | ″ | 2.75 | 420 | 1.67 | 93.8 | 9.3 | 20.3 |
| 51 | Phenyliso-cyanate 0.5 g | AlCl₃ 0.25 g | ″ | ″ | ″ | 2.58 | 430 | 1.59 | 94.0 | 10.0 | 20.8 |
| 52 | Azobenzene 1.0 g | AlCl₃ 0.5 g | Propylene | ″ | ″ | 2.57 | 450 | 1.60 | 93.9 | 7.0 | 20.3 |
| 53 | Triethyl-chlorosilane 1.0 g | AlCl₃ 0.5 g | ″ | ″ | ″ | 2.22 | 500 | 1.53 | 92.0 | 7.0 | 17.8 |
| 54 | Dimethyl-polysiloxane 1.0 g | AlCl₃ 0.5 g | ″ | ″ | ″ | 2.20 | 520 | 1.60 | 91.8 | 5.0 | 15.8 |
| 55 | Benzonitrile 0.5 g | AlCl₃ 1.0 g | ″ | ″ | ″ | 2.36 | 480 | 1.65 | 93.8 | 5.0 | 19.0 |
| 56 | Octamethyl-cyclotetra-siloxane 0.5 g | AlCl₃ 1.0 g | ″ | ″ | ″ | 2.45 | 470 | 1.71 | 92.8 | 7.3 | 20.3 |
| 57 | Diphenylether 1.8 g | Non | ″ | ″ | Heptane | 2.75 | 420 | 1.71 | 94.0 | 8.9 | 26.8 |
| 58 | Diethylether 0.44 g | ″ | ″ | ″ | ″ | 2.73 | 425 | 1.68 | 93.9 | 7.3 | 26.8 |
| 59 | Diethylketone 0.39 | ″ | ″ | ″ | ″ | 2.54 | 428 | 1.65 | 92.2 | 5.3 | 19.8 |
| 60 | Di(2-chloro-phenyl)ether 1.08 g | ″ | ″ | ″ | ″ | 2.66 | 432 | 1.66 | 93.2 | 5.7 | 21.0 |
| 61 | Diphenyl thioether 0.83 g | ″ | ″ | ″ | Toluene | 3.00 | 385 | 1.61 | 95.4 | 7.5 | 21.0 |
| 62 | Diallyl thioether 0.43 g | ″ | ″ | ″ | ″ | 2.87 | 395 | 1.65 | 95.2 | 7.7 | 22.0 |
| 63 | Thiophenol 0.49 g | ″ | ″ | ″ | ″ | 2.77 | 400 | 1.69 | 95.5 | 9.3 | 23.8 |

Table 4-continued

| Ex. No. | Catalysts 1st Pulverization Component 1 | Catalysts 1st Pulverization Component 2 | Catalysts 2nd Pulverization Additives | Catalysts 2nd Pulverization Amount ml | Washing Treatment Solvents | Polymerization Time hr | Polymerization Activity g/g.cat/hr | Polymerization Limiting Viscosity Number dl/g | Polymerization Total II % | Polymerization Content of Fine Powders, % | Control Polymers: Fine Powders % |
|---|---|---|---|---|---|---|---|---|---|---|---|
| 64 | Dipropyl thioether 0.50 g | " | " | " | " | 2.87 | 373 | 1.60 | 95.1 | 8.3 | 22.0 |
| 65 | Tri-p-tolyl phosphite 0.50 g | " | " | " | " | 2.62 | 432 | 1.55 | 94.8 | 8.3 | 18.9 |
| 66 | Tri-n-butyl phosphine 0.55 g | " | " | " | " | 2.60 | 430 | 1.77 | 94.7 | 8.2 | 23.7 |
| 67 | Phenylisocyanate 0.5 g | " | " | " | " | 2.84 | 402 | 1.65 | 93.8 | 9.8 | 21.3 |
| 68 | Dimethyl polysiloxane 1.0 g | " | " | " | " | 2.43 | 458 | 1.65 | 91.3 | 5.8 | 18.3 |
| 69 | Ethylaluminum sesquichloride 2.0 g | " | " | " | " | 2.55 | 453 | 1.67 | 93.0 | 5.0 | 18.3 |
| 70 | Ethylaluminum dichloride 1.5 g | " | " | " | Chlorobenzene | 2.46 | 463 | 1.65 | 93.0 | 7.0 | 20.3 |
| 71 | Titanium tetrachloride 1.5 g | " | " | " | Chlorobenzene | 2.55 | 453 | 1.63 | 93.3 | 9.8 | 28.3 |
| 72 | Silicon tetrachloride 1.5 g | " | " | " | benzene | 2.46 | 460 | 1.60 | 92.3 | " | 27.3 |
| 73 | Diphenylether-AlCl$_3$ complex 2.3 g | Methylphenyl thioether - AlCl$_3$ complex 1.9 g | Ethylene | " | Toluene | 2.45 | 470 | 1.63 | 95.5 | 4.9 | 18.7 |
| 74 | Diphenylether-AlCl$_3$ complex 3.5 g | Triphenylphosphate-AlCl$_3$ complex 2.5 g | " | " | " | 2.22 | 499 | 1.63 | 95.0 | 6.0 | 18.8 |
| 75 | Diphenylether-AlCl$_3$ complex 3.5 g | Tris-N,N-dimethylphosphoramide - AlCl$_3$ complex 2.1 g | " | " | " | 2.40 | 480 | 1.55 | 95.1 | 7.3 | 20.3 |
| 76 | Diphenylether-AlCl$_3$ complex 3.5 g | n-Dodecyl thioalcohol 0.9 g | " | " | " | 2.32 | 478 | 1.73 | 95.8 | 7.7 | 19.8 |
| 77 | Dimethylpolysiloxane 1.5 g | Methylphenyl thioether-AlCl$_3$ complex 1.9 g | " | " | " | 2.31 | 490 | 1.65 | 95.3 | 6.8 | 19.7 |
| 78 | Dimethylpolysiloxane 1.5 g | Triphenyl phosphate-AlCl$_3$ complex 2.5 g | " | " | " | 2.43 | 485 | 1.65 | 94.7 | 5.8 | 20.3 |

EXAMPLE 79

(1) Preparation of Ti Component

The copulverized product obtained by copulverizing Type AA TiCl$_3$ together with Al(C$_2$H$_5$)$_2$Cl and propylene according to the method of Example 5(1) was subject to a modification treatment using dibutyl ether as the modifier as follows:

To 25 g of the above copulverized product was 150 ml of n-heptane and 10 g of di-n-butyl ether added and stirred at the boiling temperature of heptane for 20 minutes and thereafter, the supernatant liquid was removed by decantation. Next, a washing treatment was conducted by adding 150 ml of n-heptane, stirring for 20 minutes and separating the n-heptane by decantation. After conducting this washing treatment five times, 150 ml of n-heptane were added to obtain an activated Ti component in the form of suspension.

(2) Polymerization

Using 0.35 g of the above activated Ti component, polymerization of propylene was conducted in the same manner as in Example 5(2).

After polymerization of 2.33 hours, 480 g of a powdery PP and 25 g of an amorphous PP were obtained.

Limiting viscosity number: 1.65 dl/g
Bulk density: 0.43 g/ml
Powder I I: 96.0%
Content of fine powders: 9.3%
Polymerization activity: 619 g/g.cat/hr
Total I I: 91.2%

COMPARATIVE EXAMPLE 11

In this example, for comparison with the Ti catalyst of Example 79 (1), the copulverization in the presence of $Al(C_2H_5)_2Cl$ and propylene was omitted and the starting Type AA $TiCl_3$ was directly subject to the modification treatment by di-n-butyl ether.

Using this modified $TiCl_3$, polymerization was conducted in the same manner as in Example 79 (2).
Polymerization activity: 460 g/g.cat/hr
Total II: 90.0%
Content of fine powders: 45.0%
Bulk density: 0.30 g/ml In this example, since the resulting PP was extremely increased in fine powders and lowered in bulk density, the polymerization velocity was markedly reduced when the polymer concentration reached about 350 g/liter-heptane.

EXAMPLES 80–103

The catalyst preparation and polymerization were conducted in the same manner as in Example 79 except that various olefins and organoaluminum compounds as set forth in Table 5, respectively, were used instead of propylene and $Al(C_2H_5)_2Cl$ in the copulverizing step and that various modifiers were used instead of di-n-butyl ether in the modification treatment. The results are given in Table 5.

Table 5, further, indicates the fine powder content and bulk density of control polymers obtained by polymerization with use of Ti catalysts which were prepared omitting the copulverization in the presence of organoaluminum compounds and olefins.

In Table 5, amounts of olefins used are 200 ml in case of Examples 80–97 and 100 ml in case of Examples 98–103; amounts of organoaluminum compounds used are 0.5 g in case of Example 80 and 1.0 g in case of Examples 81–103.

Table 5

| | Catalyst | | | | Polymerization | | | | | Control Polymers | |
|---|---|---|---|---|---|---|---|---|---|---|---|
| | Copulverization | | Modification | | | | Limiting Viscosity No. dl/g | Total II % | Content of Fine Powders % | Bulk Density g/ml | Content of Fine Powders, % | Bulk Density g/ml |
| Ex. No. | Olefins | Organoalum Compds. | Modifiers | Amount g | Time hr | Activity g/g.cat/hr | | | | | | |
| 80 | Ethylene | $Al(C_2H_5)_3$ | Di-n-butyl ether | 20 | 2.35 | 623 | 1.65 | 92.0 | 7.0 | 0.43 | 40.3 | 0.31 |
| 81 | " | Al(iso-butyl)$_2$Cl | " | " | 2.52 | 589 | 1.65 | 91.8 | 8.0 | 0.43 | 45.2 | 0.33 |
| 82 | " | Diethyl aluminum monobromide | " | " | 2.44 | 600 | 1.72 | 91.9 | 7.1 | 0.42 | 44.3 | 0.31 |
| 83 | Propylene | $Al(C_2H_5)_2Cl$ | Di-iso-amyl ether | " | 2.52 | 583 | 1.58 | 92.2 | 9.3 | 0.43 | 47.2 | 0.30 |
| 84 | " | " | Diphenyl ether | " | 2.81 | 523 | 1.66 | 93.0 | 6.8 | 0.41 | 30.8 | 0.33 |
| 85 | " | " | Diphenyl ketone | 5 | 2.49 | 603 | 1.68 | 91.0 | 9.2 | 0.40 | 31.8 | 0.32 |
| 86 | " | " | Ethyl benzoate | " | 2.50 | 589 | 1.70 | 93.3 | 6.9 | 0.43 | 30.3 | 0.33 |
| 87 | " | " | Methylphenyl thioether | 3 | 2.86 | 520 | 1.65 | 94.2 | 8.5 | 0.42 | 33.3 | 0.31 |
| 88 | Butene-1 | " | Tetramethylene sulfide | " | 2.91 | 513 | 1.63 | 93.9 | 7.0 | 0.41 | 35.0 | 0.34 |
| 89 | Propylene | " | Thiophenol | 2 | 2.86 | 520 | 1.60 | 94.3 | 7.0 | 0.42 | 30.8 | 0.32 |
| 90 | " | " | Triphenylphosphine | 5 | 2.65 | 553 | 1.65 | 93.5 | 7.0 | 0.42 | 33.0 | 0.33 |
| 91 | " | " | Methylethyl phosphinous chloride | 5 | 2.60 | 563 | 1.61 | 93.0 | 8.7 | 0.42 | 35.0 | 0.33 |
| 92 | " | " | Triphenylphosphite | 3 | 2.64 | 558 | 1.70 | 93.7 | 7.3 | 0.41 | 35.0 | 0.32 |
| 93 | " | " | Triphenylphosphate | 3 | 2.65 | 566 | 1.55 | 93.7 | 8.3 | 0.43 | 34.0 | 0.31 |
| 94 | " | " | Tri-n-butyl phosphine oxide | 5 | 2.70 | 540 | 1.53 | 93.8 | 7.5 | 0.43 | 33.5 | 0.34 |
| 95 | Butene-1 | " | Triphenylphosphine | 5 | 2.59 | 563 | 1.70 | 93.6 | 8.3 | 0.44 | 33.0 | 0.33 |
| 96 | Propylene | " | Triethyl amine | 5 | 2.78 | 523 | 1.58 | 93.5 | 7.0 | 0.43 | 35.8 | 0.33 |

Table 5-continued

| Ex. No. | Catalyst Copulverization Olefins | Catalyst Copulverization Organ-oalum Compds. | Catalyst Modification Modifiers | Catalyst Modification Amount g | Polymerization Time hr | Polymerization Activity g/g.cat/hr | Polymerization Limit-ing Vis-cosity No. dl/g | Polymerization Total II % | Polymerization Content of Fine Powders % | Polymerization Bulk Den-sity g/ml | Control Polymers Content of Fine Powders, % | Control Polymers Bulk Density g/ml |
|---|---|---|---|---|---|---|---|---|---|---|---|---|
| 97 | " | " | Phenyl-isocyanate | 5 | 2.85 | 513 | 1.71 | 93.8 | 6.0 | 0.42 | 37.3 | 0.32 |
| 98 | " | " | Benzo-nitrile | 5 | 2.81 | 520 | 1.65 | 93.7 | 7.7 | 0.42 | 32.3 | 0.34 |
| 99 | " | " | Dimethyl-poly-siloxane | 5 | 2.33 | 638 | 1.77 | 92.3 | 8.3 | 0.41 | 34.8 | 0.34 |
| 100 | " | " | Tetra-methyl-silane | " | 2.43 | 613 | 1.68 | 93.3 | 9.1 | 0.42 | 30.3 | 0.33 |
| 101 | " | " | Ethyl-aluminum sesqui-chloride | " | 2.77 | 538 | 1.66 | 94.0 | 7.8 | 0.42 | 28.3 | 0.39 |
| 102 | " | " | $TiCl_4$ | " | 2.86 | 530 | 1.65 | 94.3 | 6.6 | 0.43 | 48.3 | 0.30 |
| 103 | " | " | $SiCl_4$ | " | 2.55 | 560 | 1.60 | 92.8 | 9.3 | 0.43 | 42.5 | 0.30 |

EXAMPLE 104

50 ml of $TiCl_4$ were added to the activated Ti suspension obtained in Example 79 (1) and stirred at 70° C. for 20 minutes and thereafter, the supernatant liquid was removed by decantation. Next, a washing treatment with 150 ml of n-heptane was repeated five times to obtain a new activated Ti suspension.

Using 0.35 g of the above activated Ti component, polymerization was conducted in the same manner as in Example 5 (2).

After polymerization of 1.98 hours, 508 g of a powdery PP and 12 g of an amorphous PP were obtained.

Limiting viscosity number: 1.60 dl/g
Bulk density: 0.43 g/ml
Powder II: 98.0%
Content of fine powders: 9.8%
Polymerization activity: 755 g/g.cat/hr
Total II: 95.8%

COMPARATIVE EXAMPLE 12

In this example, for a comparison with the catalyst of Example 104, the catalyst of Comparative Example 11 was treated with $TiCl_4$ in the same manner as in Example 104.

After polymerization of 2.33 hours, 408 g of a powdery PP and 17 g of an amorphous PP were obtained.
Limiting viscosity number: 1.60 dl/g
Bulk density: 0.30 g/ml
Content of fine powders: 50.8%

Polymerization activity: 521 g/g.cat/hr
Total II: 93.0%

As is apparent from a comparison with Example 104, when the copulverization in the presence of the organoaluminum compound and olefin according to this invention is omitted, the catalyst obtained has serious disadvantages that the resulting polymer is markedly increased in fine powders and lowered in bulk density.

EXAMPLES 105–111

The catalyst components prepared in Examples 80, 86, 87, 90, 96, 99 and 101 were subject to a further treatment with $TiCl_4$ like Example 104 to obtain an activated Ti suspension.

Using 0.35 g of the above activated Ti component, polymerization was conducted like Example 5. The results are indicated in Table 6.

Table 6, further, indicates the fine powder content and bulk density of control polymers obtained by polymerization with use of Ti catalysts which were prepared omitting the copulverization in the presence of $Al(C_2H_5)_2Cl$ and propylene.

Table 6

| Ex. No. | Ex. No. of Catalyst Comp-onents | Polymerization Time (hr) | Polymerization Yield of Powdery PP (g) | Polymerization Yield of Amorph. PP (g) | Polymerization Activity g/g.cat/hr | Polymerization Powder II (%) | Polymerization Total II (%) | Polymerization Limiting Viscosity Number dl/g | Polymerization Content of Fine Powders (%) | Polymerization Bulk Density (g/ml) | Control Polymers* Content of Fine Powders (%) | Control Polymers* Bulk Density (g/ml) |
|---|---|---|---|---|---|---|---|---|---|---|---|---|
| 105 | 80 | 1.94 | 508 | 10 | 776 | 98.0 | 96.1 | 1.60 | 9.3 | 0.42 | 45.2 | 0.30 |
| 106 | 86 | 2.09 | 510 | 12 | 713 | 97.6 | 95.7 | 1.71 | 7.0 | 0.43 | 50.1 | 0.29 |
| 107 | 87 | 1.98 | 500 | 11 | 738 | 97.7 | 95.6 | 1.61 | 9.1 | 0.42 | 47.7 | 0.30 |
| 108 | 90 | 1.96 | 520 | 9 | 765 | 98.0 | 96.3 | 1.65 | 7.6 | 0.42 | 42.3 | 0.31 |
| 109 | 96 | 1.84 | 503 | 12 | 799 | 97.5 | 95.2 | 1.63 | 8.7 | 0.43 | 48.3 | 0.30 |
| 110 | 99 | 1.82 | 488 | 10 | 783 | 97.9 | 95.9 | 1.68 | 7.3 | 0.41 | 45.0 | 0.32 |
| 111 | 101 | 1.95 | 513 | 10 | 765 | 97.6 | 95.7 | 1.59 | 9.0 | 0.43 | 40.8 | 0.32 |

* : In case the copulverization in the presence of organoaluminum compounds and olefins was omitted in the preparation of catalyst components.

EXAMPLE 112

(1) Preparation of Titanium Component

A mixture of 40 g of Type AA $TiCl_3$, 150 ml of n-heptane and 10 ml of di-n-butyl ether was stirred at the boiling temperature of heptane for 20 minutes and thereafter, the n-heptane was removed by decantation.

A washing treatment with 150 ml of n-heptane, stirring and decanting was repeated five times and then, the resultant was dried by heating at 50° C. under a reduced pressure of 5 mm Hg for 20 minutes.

30 g of the dried product obtained were charged into a vibration mill and pulverized together with 1.0 ml of Al(C$_2$H$_5$)$_2$Cl for 15 minutes and then, 200 ml of gaseous ethylene were added and copulverization was conducted for 3 hours.

150 ml of n-heptane and 20 ml of di-n-butyl ether were added to the copulverized products and stirred at the boiling temperature of n-heptane for 20 minutes and the supernatant liquid was removed. Thereafter a washing treatment with use of 150 ml of n-heptane was repeated three times. Next, 150 ml of n-heptane and 50 ml of TiCl$_4$ were added and stirred at 70° C. for 20 minutes and thereafter, the washing treatment with n-heptane was repeated three times. Finally, 150 ml of n-heptane were added to obtain an activated titanium suspension.

(2) Polymerization

Using 0.25 g of the above activated titanium component, polymerization was conducted in the same manner as in Example 5 (1). After polymerization of 2.0 hours, 513 g of a powdery PP and 5 g of an amorphous PP were added.

Limiting viscosity number: 1.58 dl/g
Bulk density: 0.43 g/ml
Powder II: 98.0%
Content of fine powders: 8.9%
Polymerization activity: 1036 g/g.cat/hr
Total II: 97.0%

COMPARATIVE EXAMPLE 13

Twice the treatment with di-n-butyl ether and the treatment with TiCl$_4$ were conducted in accordance with the method of Example 112 (1) except that the copulverization in the presence of the organoaluminum compound and olefine was omitted and then, polymerization was conducted in accordance with Example 112 (2).

After polymerization of 2.5 hours, 357 g of a powdery PP and 10 g. of an amorphous PP were obtained.
Limiting viscosity number: 1.55 dl/g
Bulk density: 0.29 g/ml
Powder II: 97.0%
Content of fine powders: 52.3%
Polymerization activity: 587 g/g.cat/hr
Total II: 94.4%

It is apparent from the foregoing that with a mere repeating of the modification treatment, catalysts of a high performance cannot be obtained.

COMPARATIVE EXAMPLE 14

The catalyst preparation and polymerization were conducted in accordance with Example 112 except that the pulverization was carried out without adding Al(C$_2$H$_5$)$_2$Cl and ethylene in the preparation of catalyst.

After polymerization of 2.5 hours, 407 g of a powdery PP and 10 g of an amorphous PP were obtained.
Limiting viscosity number: 1.61 dl/g
Bulk density: 0.30 g/ml
Powder II: 97.3%
Content of fine powders: 48.7%
Polymerization activity: 667 g/g.cat/hr
Total II: 95.0%

It is noted that the specific copulverization treatment of Ti components according to this invention is effective in view of a comparison between Example 112 and the above Comparative Example in which the polymers obtained are increased in fine powders and lowered in bulk density as well as in polymerization activity and Total II.

EXAMPLE 113

(1) Preparation of Ti Component 40 g of Type AA TiCl$_3$, 3.7 g of diphenyl ether and 3.2 g of AlCl$_3$ were charged into a vibration mill pot, pulverized for 40 hours and subjected to a washing treatment with n-heptane like Example 6. Next, 150 ml of n-heptane and 20 ml of diisoamyl ether were added and stirred at 70° C. for 20 minutes. The resultant was subject to a washing treatment three times with 150 ml of n-heptane and thereafter, dried at 50° C. under a reduced pressure of 1 mm Hg.

30 g of the dried product thus obtained were pulverized together with 1.0 ml of Al(C$_2$H$_5$)$_2$Cl for 15 minutes and then, 300 ml of gaseous propylene were fed over an hour while continuing the pulverization, and copulverization were conducted further two hours.

To 25 g of the copulverized products were 150 ml of n-heptane and 20 ml of diisoamyl ether added and stirred at 70° C. for 20 minutes and then, the supernatant liquid was removed by decantation. Thereafter, a washing treatment with 150 ml of n-heptane was conducted three times at the boiling temperature of n-heptane.

Next, 150 ml of n-heptane and 50 ml of TiCl$_4$ were added, stirred at 70° C. for 20 minutes and washed five times with n-heptane at the boiling temperature of n-heptane and thus, an activated titanium was obtained in the form of suspension.

(2) Polymerization

Using 0.20 g of the activated titanium, polymerization was conducted in the same manner as in Example 5 (2). After polymerization of 2.0 hours, 523 g of a powdery PP and 4 g of an amorphous PP were obtained.

Limiting viscosity number: 1.57 dl/g
Powder II: 98.1%
Bulk density: 0.43 g/ml
Content of fine powders: 7.3%
Polymerization activity: 1320 g/g.cat/hr
Total II: 97.4%

COMPARATIVE EXAMPLE 15

The catalyst preparation and polymerization were conducted in accordance with Example 113 except that the second pulverization step in the preparation of the catalyst was conducted without adding Al(C$_2$H$_5$)$_2$Cl and propylene.

After polymerization of 2.3 hours, 358 g of a powdery PP and 7 g of an amorphous PP were obtained.

Limiting viscosity number: 1.57 dl/g
Bulk density: 0.30 g/ml
Powder II: 97.3%
Content of fine powders: 48.7%
Polymerization activity: 793 g/g.cat/hr
Total II: 95.4%

EXAMPLE 114-120

Using the catalyst components prepared in Examples 6, 11, 77, 87, 104, 112 and 113, respectively, a bulk polymerization of propylene was carried out in accordance with the following method:

A suspension of indicated amounts of the activated titanium in 30 ml of heptane and 0.8 ml of Al(C$_2$H$_5$)$_2$Cl were charged under nitrogen atmosphere into a stainless steel autoclave of 6 l in capacity.

After exhausting nitrogen from the autoclave by means of a vacuum pump, 2 Nl of hydrogen and 2.5 kg of propylene were fed. The autoclave was heated and after 15 minutes, the inner temperature was elevated to 60° C., at the temperature of which polymerization was conducted.

After 5 hours the autoclave was cooled, the contents were removed and dried at 60° C. under reduced pressure and thus, polypropylene was obtained. The results are set forth in Table 7. Also, Table 7 indicates the content of fine powders and bulk density of control polymers obtained by polymerization with use of Ti catalysts which were prepared omitting the copulverization in the presence of organoaluminum compounds and olefins.

atmosphere into a 2 l autoclave. After exhausting the nitrogen from the autoclave by means of a vacuum pump, hydrogen was fed up to a partial pressure of 2.0 kg/cm$^2$ and then, ethylene was fed to make the vapour pressure 4 kg/cm$^2$ G.

The autoclave was heated and after 20 minutes, the inner temperature was elevated to 90° C., at the temperature of which polymerization was conducted. During the polymerization ethylene was fed continuously to maintain the inner pressure at 9.5 kg/cm$^2$ G.

After polymerization of 2.5 hours, the feeding of ethylene was discontinued, unreacted gas was discharged and 300 ml of methanol were then added while stirring for 30 minutes to decompose the catalyst.

The contents of the autoclave was removed, washed three times with 200 ml of water, filtered and dried under reduced pressure at 60° C. Thus 520 g of a white, powdery polyethylene were obtained.

Limiting viscosity number: 2.23 dl/g
Bulk density: 0.43 g/ml
Content of fine powders: 5.3%
Polymerization activity: 2080 g/g.cat/hr Table 7

| | Catalysts | | Polymerization Results | | | | | | | Control Polymers | |
|---|---|---|---|---|---|---|---|---|---|---|---|
| Ex. No. | Ex. No. | Amount (mg) | Yield (g) | Activity g/g.cat/hr | Yield g/g.cat | Total II % | Limiting Viscosity Number dl/g | Bulk Density g/ml | Content of Fine Powders % | Bulk Density g/ml | Content of Fine Powders % |
| 114 | 6 | 130 | 998 | 1536 | 7677 | 94.3 | 1.65 | 0.45 | 1.3 | 0.33 | 12.3 |
| 115 | 11 | 160 | 953 | 1191 | 5956 | 96.2 | 1.66 | 0.44 | 1.0 | 0.32 | 10.8 |
| 116 | 77 | 130 | 1023 | 1574 | 7869 | 94.3 | 1.60 | 0.43 | 1.5 | 0.34 | 12.3 |
| 117 | 87 | 130 | 980 | 1508 | 7539 | 94.3 | 1.63 | 0.45 | 1.5 | 0.33 | 15.3 |
| 118 | 104 | 100 | 970 | 1940 | 9700 | 96.0 | 1.60 | 0.44 | 1.0 | 0.35 | 28.3 |
| 119 | 112 | 80 | 990 | 2475 | 12375 | 96.3 | 1.57 | 0.43 | 0.8 | 0.32 | 27.0 |
| 120 | 113 | 60 | 973 | 3243 | 16220 | 96.5 | 1.58 | 0.43 | 0.5 | 0.32 | 27.3 |

EXAMPLE 121

(1) Preparation of Ti Component 200 mM of TiCl$_4$ and 100 ml of n-hexane were charged into a 1.0 l round-bottomed flask provided with a stirrer and cooled to 0° C. and then, 220 mM of Al(C$_2$H$_5$)$_2$Cl and 200 ml of n-hexane were added dropwise over 2 hours and stirred at room temperature for 3 hours. Thereafter the supernatant solution was removed by decantation and the resultant was washed three times with 300 ml of n-hexane at room temperature and then, dried under a reduced pressure of 1 mmHg.

30 g of the TiCl$_3$ composition thus obtained were charged into a vibration mill pot and pulverized for 20 hours and further. Thereafter, 1.0 ml of Al(C$_2$H$_5$)$_3$ was added, pulverized for 15 minutes and further, 200 ml of gaseous ethylene were added and copulverization was continued for 3 hours.

To 25 g of the copulverized product obtained were 150 ml of n-heptane and 20 ml of di-iso-butyl ether added and stirred for 20 minutes. Then, the supernatant was removed by decantation and the resultant was washed five times with 150 ml of n-hexane at the boiling temperature of n-hexane and thus, a suspension of an activated Ti component was obtained.

(2) Polymerization 1.0 l of heptane, 0.10 g of the above activated Ti and 0.5 ml of Al(C$_2$H$_5$)$_2$Cl were charged under nitrogen

EXAMPLE 122

Using the catalyst prepared in Example 113 (1), copolymerization of ethylene with propylene was conducted in the same manner as in Example 113 (2) except that a gaseous mixture of ethylene with propylene containing 1.0 mol % of ethylene was fed instead of propylene.

The powdery polypropylene obtained has a bulk density of 0.42 g/ml and a fine powder content of 6.0% and thus, this invention are also effective in copolymerization reaction.

What is claimed is:

1. A process for the polymerization of ethylene and/or α-olefins to form a polymer product with a narrow particle size distribution and a reduced amount of finely powdered polymer which comprises polymerizing ethylene and/or α-olefins with use of a catalyst comprising (A) a titanium component obtained by copulverizing in the substantial absence of an inert solvent at a temperature in the range of −30° to 150° C. for from 1 to 100 hours the starting titanium component of Ziegler solid catalysts comprising titanium trichloride, or its compositions, or titanium tetrachloride, or its compositions, supported on a solid carrier and an organoluminum compound of the formula,

Al R$_m$ X$_{3-m}$ wherein R is alkyl or aryl, X is hydrogen or halogen and m is 1 to 3, together with ethylene or α-olefins in an amount between about 0.01 and 10% by weight of said starting titanium component, and (B) an organoaluminum component, said catalyst having a narrow particle size distribution, a reduced amount of finely powdered catalyst having a size of less than 5μ in a diameter, and a high catalyst activity, wherein said copulverizing with said ethylene or said α-olefin permits the particle size of said titnaium catalyst to be controlled.

2. The process of claim 1 wherein said starting titanium component is titanium trichloride or its compositions pre-pulverized prior to said copulverization.

3. A process for the polymerization of ethylene and/or α-olefins to form a product with a narrow particle size distribution and a reduced amount of finely powdered polymer which comprises polymerizing ethylene and/or α-olefins with use of a catalyst comprising (A) a titanium component obtained by copulverizing in the substantial absence of an inert solvent at a temperature in the range of −30° to 150° C. for from 1 to 100 hours the starting titanium component of Ziegler solid catalysts comprising titanium trichloride, or its compositions, or titanium tetrachloride, or its compositions, supported on a solid carrier and an organoaluminum compound of the formula

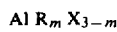

Al $R_m X_{3-m}$ wherein R is alkyl or aryl, X is hydrogen or halogen and m is 1 to 3, together with ethylene or α-olefins in an amount between about 0.01 to 10% by weight of said starting titanium component, and subjecting the above copulverized titanium component to a modification treatment which comprises bringing said titanium component into contact with an inert organic solvent or a mixture thereof with a modifier, and thereafter separating the titanium component from the solvent, wherein the amount of said modifier is within the range of 0.001 to 100 parts by weight based on 1 part by weight of the copulverized products, and said modifier is selected from the group consisting of (1) an oxygen-, sulphur-, phosphour-, nitrogen- or silicon-containing organic compound, (2) a combination of said organic compound of the item (1) with aluminum halides, (3) an organoaluminum compound and (4) Lewis acid, and (B) an organoaluminum compound, said catalyst having a narrow particle size distribution, a reduced amount of finely powdered catalyst having a size of less than 5μ in a diameter, and high catalyst activity, wherein said copulverizing with said ethylene or said α-olefin permits the particle size of said titanium catalyst to be controlled.

4. The process of claim 3 wherein said titanium component is a pulverized product obtained by adding to titanium trichloride or its compositions additives selected from the group consisting of (1) an oxygen-, sulphur-, phosphour-, nitrogen- or silicon-containing organic compound, (2) a combination of said organic compound of the item (1) with aluminum halides, (3) an organoaluminum compound and (4) Lewis acid, and pulverizing together, said additive comprising between 0.5 and 100 mole percent based on said titanium trichloride or its compositions.

5. The process of claim 3 wherein said starting titanium component is titanium trichloride or its compositions subjected to a modification treatment with modifiers selected from the group consisting of (1) an oxygen-, sulphur-, phosphour-, nitrogen- or silicon-containing organic compound, (2) a combination of said organic compound of the item (1) with aluminum halides, (3) an organoaluminum compound and (4) Lewis acid, prior to said copulverization step.

6. A titanium catalyst for polymerization of ethylene and/or α-olefins to form a polymer product with a narrow particle size distribution and a reduced amount of finely powdered polymer, said catalyst being obtained by copulverizing in the substantial absence of an inert solvent at a temperature in the range of −30° to 150° C. for 1 to 100 hours the starting titanium component of Ziegler solid catalyst comprising titanium trichloride, or its compositions, or titanium tetrachloride, or its compositions, supported on a solid carrier and an organoaluminum compound of the formula

Al $R_m X_{3-m}$ wherein R is alkyl or aryl, X is hydrogen or halogen and m is 1 to 3, together with ethylene or α-olefins in an amount between about 0.01 and 10% by weight of said starting titanium component, said catalyst having a narrow particle size distribution, a reduced amount of finely powdered catalyst having a size of less than 5μ in diameter, and high catalyst activity, wherein said copulverizing with said ethylene or α-olefins permits the particle size of said titanium catalyst to be controlled.

7. The catalyst of claim 6 wherein said starting titanium component is titanium trichloride or its compositions pre-pulverized prior to said copulverization.

8. A modified titanium catalyst for polymerization of ethylene and/or α-olefins to form a polymer product with a narrow particle size distribution and a reduced amount of finely powdered polymer, said catalyst being obtained by copulverizing in the substantial absence of an inert solvent at a temperature in the range of −30° to 150° C. for from 1 to 100 hours the starting titanium component of Ziegler catalysts comprising titanium trichloride, or its compositions, or titanium tetrachloride, or its compositions, supported on a solid carrier and an organoaluminum compound of the formula

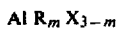

Al $R_m X_{3-m}$ wherein R is alkyl or aryl, X is hydrogen or halogen and m is 1 to 3, together with ethylene or α-olefins in an amount between about 0.01 and 10% by weight of said starting titanium component, and subjecting the above copulverized titanium component to a modification treatment which comprises bringing said titanium component into contact with an inert organic solvent or a mixture thereof with a modifier, and thereafter separating the titanium component from the solvent, wherein the amount of said modifier is within the range of 0.001 to 100parts by weight based on 1 part by weight of the copulverized products, and said modifier is selected from the group consisting of (1) an oxygen-, sulphur-, phosphour-, nitrogen- or silicon-containing organic compound, (2) a combination of said organic compound of the item (1) with aluminum halides, (3) an organoaluminum compound and (4) Lewis acid, said catalyst having a narrow particle size distribution, a reduced amount of finely powedered catalyst having a size of less than 5μ in diameter, and high catalyst activity, wherein said copulverizing with said ethylene or said α-olefins permits the particle size of said titanium catalyst to be controlled.

9. The modified titanium catalyst of claim 8 wherein said starting titanium component is titanium trichloride or its compositions pulverized in the presence of or in the absence of additives selected from the group consisting of (1) an oxygen-, phosphour-, nitrogen- or silicon-containing organic compound, (2) a combination of said organic compound of item (1) with aluminum halides, (3) an organoaluminum compound and (4) Lewis acid.

10. The modified titanium catalyst of claim 9 wherein said additive is selected from the group consisting of (1) an oxygen-, sulphur-, phosphour-, nitrogen- or silicon-containing organic compound, (2) a combination of said organic compound of the item (1) with aluminum halides, (3) an organoaluminum compound and (4) Lewis acid.

11. The modified titanium catalyst of claim 8, wherein said starting titanium component is titanium trichloride or its compositions subjected to a modification treatment through contact with an inert organic solvent or its mixtures with modifiers selected from the group consisting of (1) an oxygen-, sulphur-, phosphour-, nitrogen- or silicon-containing organic compound, (2) a combination of said organic compound of the item (1) with aluminum halides, (3) an organoaluminum compound and (4) Lewis acid.

* * * * *